Patented Nov. 10, 1953

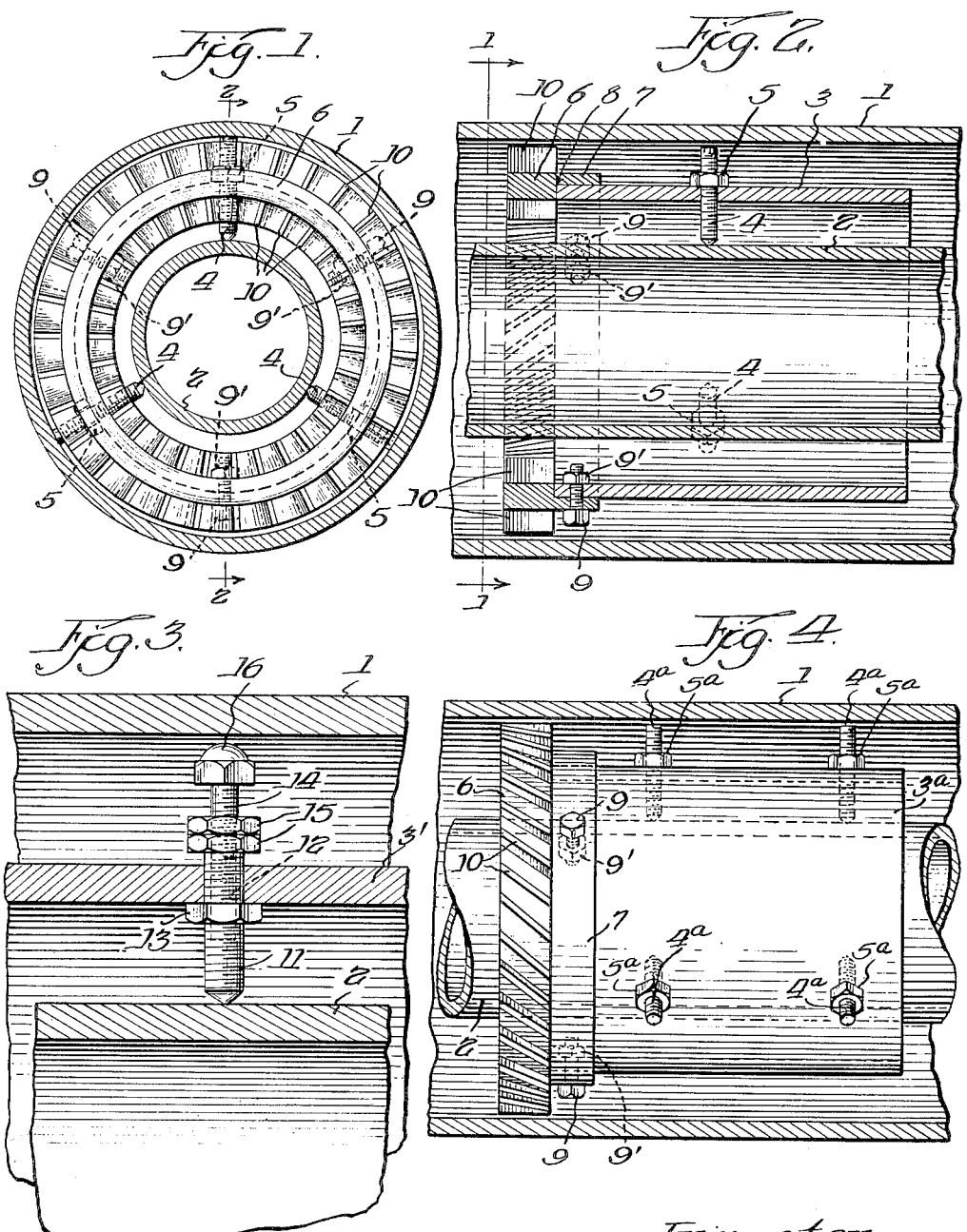

2,658,530

UNITED STATES PATENT OFFICE 2,658,530

COMBINED SUPPORT AND TURBULENCE EFFECTING DEVICE

Edward W. Kaiser, Chicago, Ill.

Application October 3, 1950, Serial No. 188,173

4 Claims. (Cl. 138—87)

This invention relates to improvements in supporting devices for use in housed or jacketed conduit systems, such as described and claimed in my pending applications, Serial No. 511,366, filed November 22, 1943, now Patent No. 2,570,246, and Serial No. 47,851, filed September 4, 1948.

It is an object of the invention to provide a combined support, spacer and turbulence effecting device for the inner pipes of housed or jacketed conduit systems, whereby (a) the inner pipe or pipes will be firmly and dependably supported within the housings or jackets therefor in spaced relation to the inner sides of said housing or jacket walls and assure the maintenance of a continuous flow-way therebetween, and (b) cause heat or cold transmitting medium longitudinally traversing said flow-way to be rendered turbulent; hence, ensure its positive over-all contact about and with the walls of the inner pipe, and so, effect a maximum exchange of energy thereto.

It is also an object of the invention to provide a device of the stated character which, if desired, may be used to support only the inner pipe of a housed or jacketed conduit system in spaced relation to the inner sides of the housing or jacket walls, but which, by simple assembly, can additionally be made to receive and firmly support turbulence flow creating means in effective position between said inner pipe and housing or jacket.

In conduit systems of the housed or jacketed inner pipe type, where a heat or cold exchange fluid or gas is flowed between the inner pipe and the housing or jacket, it is most desirable that such exchange medium shall be evenly and uniformly contacted with and about the inner pipe walls, whereby to transmit the said inner pipe a maximum degree of heat or cold, and hence, ensure the greatest possible economies and operational efficiencies; moreover, that said inner pipe shall be firmly supported in spaced relation to its housing or jacket with the least possible physical supporting connection or contact therewith, in order to reduce heat or cold losses, via direct transmission, from the inner pipe to the housing or jacket.

By means of my invention, a system such as above indicated, will be enabled to obtain the aforesaid advantages and benefits, and at the same time, the inner pipe will be firmly supported in its conduit system housing or jacket in constant spaced relation thereto and with a minimum of contact therewith, yet, may be moved longitudinally of said housing or jacket in constant spaced relation thereto and with a minimum of contact therewith, yet, may be moved longitudinally of said housing or jacket to compensate for expansion or contraction thereof, or to facilitate removal and/or installation of sections of the inner pipe and their coupling in line.

The foregoing, as well as other objects, advantages and meritorious teachings of my invention, will be in part obvious and in part pointed out in the following detailed disclosure thereof, when taken in conjunction with the accompanying drawings, it being understood that the forms of the invention presented herein are precise and what are now considered to be the best modes of embodying its principles, but that other modifications and changes may be made in specific embodiments without departing from its essential features.

In the drawings:

Figure 1 is a transverse section taken on the line 1—1 of Figure 2, looking in the direction in which the arrows point.

Figure 2 is a longitudinal section taken on the line 2—2 of Figure 1, looking in the direction in which the arrows point.

Figure 3 is an enlarged fragmentary detail, partly in longitudinal section, showing portions of the support sleeve, housing or jacket and inner pipe, and a modified form of supporting leg for the support sleeve, and Figure 4 is a longitudinal section through a portion of a housing or jacket with an inner pipe therein, showing a modified form of supporting leg arrangement on the support sleeve for supporting said inner pipe in spaced relation to the inner sides of the housing or casing.

Referring in detail to that form of the invention shown in Figures 1 and 2, of the accompanying drawings, the same is primarily intended for use in conduit systems of the housed or jacketed inner pipe type, though, of course, is not necessarily limited to such usage. Such a system includes a tubular housing or jacket 1, an inner pipe 2, telescopically received therein, both constructed of cast iron, steel or other adequate stress resistant and enduring materials. The diameter of the inner pipe 2 is less than that of the housing 1 and is adapted to be supported in spaced relation in and through the latter, as shown in Figures 1 and 2.

To effect supporting of the inner pipe, as above, a tubular body or sleeve 3, made of cast iron or other suitable material, is engaged over and about a portion of the inner pipe 2 and received in the housing 1. The cross-sectional shape of the support sleeve 3 may, though not necessarily, substantially correspond to that of the housing 1 and pipe 2. Its diameter is less than the inside diameter of said housing 1 and greater than the outside diameter of said pipe 2. Consequently, the support sleeve will, as shown in Figures 1 and 2, be interposed between the housing and the inner pipe.

Supporting legs, screw-threaded throughout their lengths, collectively identified by the reference numeral 4, are radially engaged through suitable screw-threaded openings formed in and about the support sleeve 3, preferably in equi-spaced relation. The lengths of the legs preferably correspond and are such that when radially engaged through the support sleeve 3, they will be slightly less than the space between the outer side of the inner pipe 2 and the inner side of the housing 1. The innermost ends of said legs will have bearing contact with adjacent portions of the inner pipe, by suitable screw adjustment thereof, and so, are adapted to support the latter in a position substantially concentrically of the support sleeve 3. The outermost ends of the lower leg or legs 4 (see Figure 1), have bearing contact or engagement with adjacent portions of the housing 1, while the upper leg or legs have their outermost ends spaced from adjacent portions of this housing 1 (also see Figure 1). Therefore, it will be seen that the inner pipe 2 will be provided a firm, positive and enduring supporting means whereby it will be retained in the aforesaid substantially concentric position of and within the housing 1. Moreover, it is of material importance to here note that while the inner pipe 2 will be supported within the housing 1, as above, relative longitudinal movement between these two members will be permitted; particularly, the inner pipe 2 will be permitted to move longitudinally within the housing 1, and thus, will be permitted to automatically compensate for its expansion and/or contraction during usage, as well as for its longitudinal movement into, from or within the housing 1.

In order that an established adjusted relationship between the support sleeve 3 and the inner pipe 2 will be maintained, suitable locking nuts 5 are engaged on the various supporting legs 4 and are turned into binding engagement with adjacent portions of the support sleeve 3, whereby to lock said supporting legs in their respective adjusted positions.

It will, of course, be understood and appreciated that the number of supporting legs 4 may be varied, such as conditions of usage, or preference, may dictate or warrant.

In certain types of housed or jacketed conduit systems employing my invention, cooling or heating fluids or gases are flowed in or through the space or flow-way between the inner sides of the housing and the outer sides of the inner pipe 2. Thus, a cooling or heating exchange is effected to the inner pipe 2, and in consequence, to matters flowing therethrough, for various purposes. During this flow of fluid or gases through the flow-way, it is highly desirable, if not essential, that they shall have maximum area contact with the sides of the inner pipe, in order that a maximum degree of cooling or heating exchange to said inner pipe and its contents shall be effected and maintained. To ensure such an accomplishment, I mount on and support, from the support sleeve 3, a turbulence creating device. Said device comprises a circular collar-like body 6, made of cast iron, steel or other suitable material. The outside diameter of the body is somewhat greater than that of the support sleeve 3, while the inside diameters of each substantially correspond (see Figure 2). A neck or annular flange 7 is integral with or otherwise fixedly carried on one end of the body 6, having its outer surface preferably contiguous with that of said body, while its inner surface snugly and telescopically engages over an adjacent end portion of the support sleeve 3, abuttingly engaging an internal annular shoulder 8 formed at the point of jointure of said neck with the body 6. Thus, the extent of mounting engagement of the collar-like body on the support sleeve 3, is effectually and positively limited. Relatively circumferentially spaced securing bolts 9 are engaged through adjacent portions of the support sleeve 3 and the neck 7 and have locking nuts 9' turned thereonto into binding engagement with portions of said sleeve. Thereby, the turbulence device body is fixedly connected to the support sleeve.

Pluralities or series of substantially equi-spaced, relatively parallel radially extending turbulence effecting rigid blades or vanes 10 are integral with, welded to or otherwise fixedly mounted on and disposed across the inner and outer peripheral surfaces of the collar-like body 6. Said blades, as clearly shown in the drawings, are disposed at angles oblique to the longitudinal axes of the housing 1, inner pipe 2 and support sleeve 3. Their lengths, preferably, are such that they terminate flushly with the opposite ends of the collar-like body 6, while their depths are such that they span material portions of the aforesaid flow-way between the housing and the outer side of the inner pipe. Consequently, it is manifest that with relative longitudinal movement between the housing and the inner pipe, the outer series of the blades 10 will not interfere with or impede the same; while both inner and outer series of the blades 10, by being spaced from adjacent portions of the housing and the inner pipe, will not disadvantageously impede or restrict the longitudinal flow-way therebetween, but nevertheless, will efficiently function to create the desired turbulency of matters flowed therethrough.

Of course, the angular positioning or seating of the blades 10 may be varied, as desired or required.

Fluids or gases traversing the aforesaid flow-way and contacting with the oblique blades 10, will be caused to axially swirl. In so doing, they will be moved over, about and longitudinally along the inner pipe 2, effecting a maximum of contact with said pipe, and hence, a maximum exchange of their energies thereto and to those matters flowing therethrough.

In the event that the matters flowing through the flow-way or moving in a longitudinal or approximately longitudinal direction which will cause them to first contact the support sleeve end away from the turbulence device on its opposite end, I have found that their flow will be divided, and being divided, will travel through the passageways on either side (inner and outer) of the support sleeve 3. In so doing, said flowing matters will be thoroughly contacted with the opposed series of blades 10 on the collar-like body 6, hence, their resultant turbulence will be increased and a truly maximum of exchange of their energies with the inner pipe 2 will be effected.

When matters flowing through the flow-way move in a direction whereby they first contact the turbulence blades 10, they will be divided and swirled, and immediately thereafter, move about and over the inner and outer sides of the support sleeve 3. Leaving the support sleeve, said matters will be highly turbulent and swirling and the divided portions thereof will merge without appreciable loss of such turbulence or swirling, and will effect a maximum area contact with and along the inner pipe 2.

The length of the support sleeve 3 may be, optionally, increased or decreased without departing from the spirit of the invention.

Due to the fact that the supporting legs 4 are endwise supportingly engaged or engageable with but small portions of the inner sides of the housing 1 and outer sides of the inner pipe 2, the exchange of cold or heat therebetween, by conduction through the supporting legs, will be reduced to substantially negligible amounts.

The number of my improved devices used in the line of an equipped conduit system may, as will be readily understood, be varied; the installed number thereof being regulated according to the sizes or lengths of the housing or inner pipes of a system and the degree of turbulence to be imparted to the exchange fluids or gases traversing the housing-inner pipe flow-way. Furthermore, in certain instances of installation, it may be advantageous and desirable to employ only the support sleeve 3 and its supporting legs 4 for supporting the inner pipe within the housing 1 in spaced relation to its inner sides. At such times, use of the turbulence creating device of the invention may be dispensed with, it being borne in mind that the same is separable from the support sleeve.

In Figure 3 of the drawings, I have shown a somewhat modified form of supporting leg for supporting the inner pipe 2 in spaced relation to the inner sides of the housing 1. This modified form of supporting leg may, if desired, be substituted for the form of supporting leg 4, hereinbefore described.

The modified form of supporting leg is of the jack-screw type. It comprises a body or shank 11, the normally outer portion of which is formed with a co-axially disposed internally screw-threaded bore 12 opening onto its normally outer end. This body is externally screw-threaded throughout its length and is adapted to be threadedly engaged in a suitable opening provided therefore in the support sleeve 3'; a lock nut 13 being turned thereonto and into binding or locking engagement with an adjacent portion of the inner side of the support sleeve 3', as well shown in said Figure 3. An extension screw 14, whose diameter is less than that of the shank 11, but substantially corresponds with the diameter of the internally screw-threaded bore 12, is longitudinally threadedly engaged in said bore. Suitable lock nuts 15 are threadedly engaged with appropriate portions of the shank 11 and the screw 14, and by relative adjustment therebetween, will function to securely lock or retain the extension screw 14 in a longitudinally adjusted position or relationship to the shank 11. The outer end of the extension screw 14 is preferably provided with a head portion 16 adapted to have supporting engagement or contact with adjacent portions of the inner side of the housing 1.

The form of supporting legs above described and illustrated in Figure 3 of the accompanying drawings can, obviously, be adjusted to different lengths whereby to effect the supporting of the inner pipe 2 in a particularly desired location or position within and with relation to the inner sides of the housing 1.

Under certain conditions of installation and operation of my invention in a housed or jacketed conduit system, it may be desirable to employ a supporting leg arrangement such as shown in Figure 4 of the accompanying drawings. Herein, the support sleeve 3a has longitudinally spaced screw-threaded supporting legs 4a threadedly engaged through the same in relatively circumferentially spaced relation thereabout. Thus, it is seen that the supporting sleeve will be stably supported between the inner sides of the housing 1 and the outer sides of the inner pipe 2 at or in proximity to its opposite ends. Consequently, any and all possibility of detrimental movement of the support sleeve transversely of the housing or inner pipe will be prevented and the turbulence device carried on one end thereof will be firmly supported in radially spaced relation to said housing and inner pipe. It will be also understood and appreciated that collective longitudinal movement of the inner pipe 2 and the support sleeve 3a with relation to the housing 1 will be permitted, as when said inner pipe expands or contracts, or when it is longitudinally moved, as during installation, removal, replacement, etc.

I claim:

1. In combination with a conduit housing and a conduit in and disposed longitudinally thereof, a solid wall support sleeve about said conduit disposed in spaced relation longitudinally of and between the same and the housing, radially disposed screw-threaded supporting legs threadedly engaged through the support sleeve in circumferentially spaced relation thereabout having their opposite ends movably engaged with portions of the outer side of the conduit and the inner sides of the housing and supporting said sleeve in said spaced relation, and means for locking the supporting legs to the support sleeve.

2. In combination with a conduit housing and a conduit in and disposed longitudinally thereof, a solid wall support sleeve about said conduit disposed in spaced relation longitudinally of and between the same and the housing, radially disposed screw-threaded supporting legs threadedly engaged through the support sleeve in circumferentially spaced relation thereabout having their opposite ends movably engaged with portions of the outer sides of the conduit and the inner sides of the housing and supporting said sleeve in said spaced relation, means for locking the supporting legs to the support sleeve, a collar-like body carried by and at one end of the support sleeve, and relatively spaced blades on and extending beyond the opposite sides of said collar-like body and the opposite sides of said support sleeve into and about the space between the same and adjacent sides of said housing and conduit, said blades on the opposite sides of the collar-like body being relatively parallel and oblique to the longitudinal axes of the housing, conduit and support sleeve.

3. In combination with a conduit housing and a conduit in and disposed longitudinally thereof in radially spaced relation to the same, a solid wall support sleeve about said conduit disposed longitudinally thereof and radially spaced therefrom and from the housing, means engaged with and circumferentially about the support sleeve supporting the same in said radially spaced relation to the conduit and housing, and relatively spaced blades carried by the support sleeve adjacent one end thereof extended radially beyond its opposite sides into and about the space between the same and adjacent sides of said housing and conduit, said blades being relatively parallel and oblique to the longitudinal axes of the housing, conduit and support sleeve.

4. In combination with a conduit housing and a conduit in and disposed longitudinally thereof in spaced relation to the same, a solid wall support sleeve about said conduit disposed longitudinally of a portion thereof and radially spaced therefrom and from the housing, length adjustable means engaged with and circumferentially about the support sleeve supporting the same in said spaced relation to the conduit and housing, an annular body corresponding in diameter to that of the support sleeve detachably connected to and supported adjacent one end of said support sleeve, and relatively spaced blades fixedly carried on and extended from the opposite sides of said annular body and the opposite sides of said support sleeve into the space between the same and adjacent sides of said housing and conduit and having their free ends spaced from the inner side of said conduit housing and said inner pipe, said blades being relatively parallel and oblique to the longitudinal axes of the housing, conduit and support sleeves.

EDWARD W. KAISER.

References Cited in the file of this patent

UNITED STATES PATENTS

| Number | Name | Date |
|---|---|---|
| 308,943 | Aldrich | Dec. 9, 1884 |
| 518,016 | Zahikian | Apr. 10, 1894 |
| 538,589 | Kemble | Apr. 30, 1895 |
| 732,400 | Dresser | June 30, 1903 |
| 1,111,688 | Bonitz | Sept. 22, 1914 |
| 1,824,717 | Harty et al. | Sept. 22, 1931 |
| 2,436,845 | Wiler | Mar. 22, 1948 |